US010470028B2

(12) United States Patent
Zhang et al.

(10) Patent No.: US 10,470,028 B2
(45) Date of Patent: Nov. 5, 2019

(54) USER PLANE DATA TRANSMISSION METHOD, MOBILITY MANAGEMENT ENTITY, EVOLVED NODEB, AND SYSTEM

(71) Applicant: Huawei Technologies Co., Ltd., Shenzhen, Guangdong (CN)

(72) Inventors: Wenzhuo Zhang, Chengdu (CN); Xun Zhang, Shenzhen (CN); Xiudong Deng, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 14/744,646

(22) Filed: Jun. 19, 2015

(65) Prior Publication Data

US 2015/0289303 A1 Oct. 8, 2015

Related U.S. Application Data

(63) Continuation of application No. PCT/CN2012/087729, filed on Dec. 27, 2012.

(51) Int. Cl.
*H04W 76/00* (2018.01)
*H04W 8/02* (2009.01)
(Continued)

(52) U.S. Cl.
CPC ........... *H04W 8/02* (2013.01); *H04L 12/4633* (2013.01); *H04L 69/167* (2013.01); *H04L 69/22* (2013.01);
(Continued)

(58) Field of Classification Search
CPC .................................................. H04W 76/022
See application file for complete search history.

(56) References Cited

U.S. PATENT DOCUMENTS 7,283,497 B2 10/2007 Mueller
2007/0109966 A1* 5/2007 Lee ..................... H04L 12/4633
370/231
(Continued)

FOREIGN PATENT DOCUMENTS

CN 101019450 A 8/2007
CN 101369977 A 2/2009
(Continued)

OTHER PUBLICATIONS

Conta et al. ("Generic Packet Tunneling in IPv6 Specification", RFC 2473, 1998).*
(Continued)

*Primary Examiner* — John D Blanton
(74) *Attorney, Agent, or Firm* — Slater Matsil, LLP

(57) ABSTRACT

The present invention relates to a user plane data transmission method, a mobility management entity, an evolved NodeB, and a system, where the method includes: setting up a radio access bearer connection with a radio access network node; and performing user plane data transmission with the radio access network node by using a user plane protocol stack, where the user plane protocol stack includes a physical layer, a data link layer, and a network layer, where the network layer includes an IPv6 header and a flow label of the IPv6 header carries a user plane tunnel endpoint identifier TEID, or the network layer carries a type identifier of a GTP-U header.

4 Claims, 8 Drawing Sheets

(51) Int. Cl.
*H04W 80/04* (2009.01)
*H04L 12/46* (2006.01)
*H04L 29/06* (2006.01)
*H04W 76/12* (2018.01)

(52) U.S. Cl.
CPC ........... *H04W 76/12* (2018.02); *H04W 80/04* (2013.01); *H04W 80/045* (2013.01)

(56) References Cited

U.S. PATENT DOCUMENTS

| | | | | |
|---|---|---|---|---|
| 2009/0010271 | A1* | 1/2009 | Bachmann | H04L 12/14 370/401 |
| 2009/0052409 | A1 | 2/2009 | Chen et al. | |
| 2011/0158166 | A1* | 6/2011 | Lee | H04W 28/06 370/328 |
| 2012/0099564 | A1* | 4/2012 | Bekiares | H04L 47/2441 370/336 |
| 2013/0070770 | A1 | 3/2013 | Zha et al. | |
| 2014/0140321 | A1* | 5/2014 | Janakiraman | H04L 69/08 370/331 |
| 2015/0071169 | A1* | 3/2015 | Wang | H04W 76/022 370/328 |

FOREIGN PATENT DOCUMENTS

| | | |
|---|---|---|
| CN | 102244688 A | 11/2011 |
| EP | 2 458 799 A1 | 5/2012 |
| EP | 2 464 063 A1 | 6/2012 |
| WO | WO 02/068519 A2 | 9/2002 |
| WO | WO 02/069519 A1 | 9/2002 |

OTHER PUBLICATIONS

Sha Luo, et al., "A Secured Flow Label Based QOS Scheme for the Evolved Packet Core in the Evolved Packet System", Proceedings of IC-BNMT2010, Oct. 26, 2010, p. 289-293.

"3rd Generation Partnership Project; Technical Specification Group Core Network and Terminals; General Packet Radio System (GPRS) Tunnelling Protocol User Plane (GTPv1-U) (Release 11)", 3GPP TS 29.281 V11.5.0, Dec. 2012, 27 pages.

J. Reynolds, et al., "Assigned Numbers", Network Working Group, Oct. 1994, 246 pages.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, Dec. 2012, 340 pages.

"3rd Generation Partnership Project; Technical Specification Group Radio Access Network; Evolved Universal Terrestrial Radio Access (E-UTRAN); S1 data transport (Release 11)", 3GPP TS 36.414 V11.0.0, Sep. 2012, 8 pages.

S. Deering, et al., "Internet Protocol, Version 6 (IPv6) Specification", Network Working Group, Dec. 1998, 42 pages.

* cited by examiner

USER PLANE DATA TRANSMISSION METHOD, MOBILITY MANAGEMENT ENTITY, EVOLVED NODEB, AND SYSTEM

CROSS-REFERENCE TO RELATED APPLICATIONS

This application is a continuation of International Application No. PCT/CN2012/087729, filed on Dec. 27, 2012, which is hereby incorporated by reference in its entirety.

TECHNICAL FIELD

The present invention relates to the field of wireless communications technologies, and in particular, to a user plane data transmission method, a mobility management entity, an evolved NodeB, and a system.

BACKGROUND

In a wireless communications technology, a user equipment (User Equipment, UE) is connected to a core network by using a radio access network (Radio Access Network, RAN), and a path between the RAN and the core network is called an IP backhaul network (IP Backhaul).

In a wireless communication process, user data (user data) is sent to the core network through a transport network, a base station (evolved NodeB, eNB) is connected to a mobility management entity (Mobility Management Entity, MME)/serving gateway (Serving Gateway, SGW) by using an S1 interface, and the base station eNB is connected to another base station eNB through an X2 interface. User data on the S1 interface and the X2 interface is borne in an IP transmission path by using the GTP-U protocol. A format of a user plane (User plane) protocol stack is shown in FIG. 1, including a physical layer (layer L1), a data link layer (layer L2), a network layer (IP layer), a User Datagram Protocol (User Datagram Protocol, UDP) layer, a GPRS Tunneling Protocol-User plane (GPRS Tunneling Protocol-User, GTP-U) layer, and user data (user data). In a process of wireless signaling interaction, a system control plane allocates one tunnel endpoint identifier (Tunnel Endpoint Identifier, TEID) to a user. In a process of user data packet forwarding, the allocated TEID is carried in a TEID field of a GTP-U header and is used to uniquely identify a user tunnel in a radio access system.

With the exhaustion of Internet Protocol version 4 (Internet Protocol Version 4, IPv4) addresses, the Internet Protocol version 6 (Internet Protocol Version 6, IPv6) will gradually replace IPv4 in radio access networks, and nodes that use an IPv6 network as an IP backhaul network of a base station are on the rise. For an IPv6 backhaul network, a structure of a wireless user data packet in transmission is as follows:

| L1 | L2 | IPv6 | UDP | GTP-U | User data |
|----|----|------|-----|-------|-----------|

It may be seen that, compared with IPv4, in IPv6, a structure of a packet in transmission does not change essentially, and only an IPv6 header replaces an IPv4 header.

However, compared with an IPv4 backhaul network, an IPv6 backhaul network increases overheads of network transmission, reduces proportion of user payload, and affects average transmission efficiency of service data.

SUMMARY

In view of this, an objective of the present invention is to provide a user plane data transmission method, a mobility management entity, an evolved NodeB, and a system, so as to simplify network layers of radio access, reduce overheads of network transmission, increase proportion of user payload, reduce complexity of a user data processing device, and improve data transmission efficiency of radio access.

According to a first aspect, a user plane data transmission method is provided, where the method includes:

setting up a radio access bearer connection with a radio access network node; and performing user plane data transmission with the radio access network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer GTP-U, where the network layer includes an IPv6 header or an IPv4 header, where a next-hop header of the basic IPv6 header or a protocol type of the IPv4 header carries a type identifier of the GTP-U header.

With reference to the first aspect, in a first possible Implementation manner of the first aspect, when the user plane protocol stack uses a flow label to carry a user plane TEID, the setting up a radio access bearer connection with a radio access network node includes:

creating a radio access bearer E-RAB setup request and sending the request to the radio access network node, where the E-RAB setup request includes an interface flow label S1_FL, where the interface flow label carries a first bearer identity that is allocated to a user plane TEID of the E-RAB; and receiving an E-RAB setup response that is returned by the radio access network node with respect to the E-RAB setup request, extracting, from the E-RAB setup response, a second bearer identity that is allocated by the radio access network node to the user plane TEID of the E-RAB, and recording a mapping relationship between the first bearer identity and the second bearer identity.

With reference to the first aspect, in a second possible implementation manner of the first aspect, the performing user plane data transmission with the radio access network node by using a user plane protocol stack includes:

receiving first user plane data sent by a serving gateway SGW, encapsulating the first user plane data with an IPv6 header or an IPv4 header, and sending the encapsulated first user plane data to the radio access network node; or receiving second user plane data sent by the radio access network node, decapsulating the second user plane data to remove an IPv6 header or an IPv4 header, and forwarding the decapsulated second user plane data to the SGW.

With reference to the second possible implementation manner of the first aspect, in a third possible implementation manner of the first aspect, the encapsulating the first user plane data with an IPv6 header or an IPv4 header includes:

when the user plane protocol stack uses a flow label to carry a user plane TEID, encapsulating the first user plane data with an IPv6 header, where a flow label of the IPv6 header carries the second bearer identity;

when the user plane protocol stack uses a next-hop header to carry a type identifier of the GTP-U header, encapsulating the first user plane data with an IPv6 header, where a next-hop header of the IPv6 header carries the type identifier of the GTP-U header; or when the user plane protocol stack uses a protocol type to carry a type identifier of the GTP-U header, encapsulating the first user plane data with an IPv4 header, where a protocol type of the IPv4 header carries the type identifier of the GTP-U header.

According to a second aspect, a user plane data transmission method is further provided, where the method includes:

setting up a radio access bearer connection with a core network node; and performing user plane data transmission with the core network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

With reference to the second aspect, in a first possible implementation manner of the second aspect, when the user plane protocol stack uses a flow label to carry a user plane TEID, the setting up a radio access bearer connection with a radio access network node includes:

receiving a radio access bearer E-RAB setup request sent by the core network node, where the E-RAB setup request includes an interface flow label S1_FL, where the interface flow label carries a first bearer identity that is allocated to a user plane TEID of the E-RAB; and allocating a second bearer identity to the user plane TEID of the E-RAB, recording a mapping relationship between the first bearer identity and the second bearer identity, constructing an E-RAB setup response by using the second bearer identity, and sending the response to the core network node.

With reference to the second aspect, in a second possible implementation manner of the second aspect, the performing user plane data transmission with the radio access network node by using a user plane protocol stack includes:

receiving first user plane data sent by the core network node, decapsulating the first user plane data to remove an IPv6 header or an IPv4 header, and forwarding the decapsulated first user plane data to a user equipment UE; or receiving second user plane data sent by a user equipment UE; encapsulating the second user plane data with an IPv6 header or an IPv4 header, where a flow label of the IPv6 header carries the second bearer identity; and sending the encapsulated second user plane data to the core network node.

With reference to the second possible implementation manner of the second aspect, in a third possible implementation manner of the second aspect, the encapsulating the second user plane data with an IPv6 header or an IPv4 header includes:

when the user plane protocol stack uses a flow label to carry a user plane TEID, encapsulating the second user plane data with an IPv6 header, where a flow label of the IPv6 header carries the first bearer identity;

when the user plane protocol stack uses a next-hop header to carry a type identifier of the GTP-U header, encapsulating the second user plane data with an IPv6 header, where a next-hop header of the IPv6 header carries the type identifier of the GTP-U header; or when the user plane protocol stack uses a protocol type to carry a type identifier of the GTP-U header, encapsulating the second user plane data with an IPv4 header, where a protocol type of the IPv4 header carries the type identifier of the GTP-U header.

According to a third aspect, a mobility management entity is further provided, where the mobility management entity includes:

a first communication connection module, configured to set up a radio access bearer connection with a radio access network node; and a first data transmission module, configured to perform user plane data transmission with the radio access network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

With reference to the third aspect, in a first possible implementation manner of the third aspect, the first communication connection module includes:

a request sending unit, configured to: when the user plane protocol stack uses a flow label to carry a user plane TEID, create a radio access bearer E-RAB setup request and send the request to the radio access network node, where the E-RAB setup request includes an interface flow label S1_FL, where the interface flow label carries a first bearer identity that is allocated to a user plane TEID of the E-RAB;

a first receiving unit, configured to receive an E-RAB setup response that is returned by the radio access network node with respect to the E-RAB setup request; and a first processing unit, configured to extract, according to the E-RAB setup response, a second bearer identity that is allocated by the radio access network node to the user plane TEID of the E-RAB, and record a mapping relationship between the first bearer identity and the second bearer identity.

With reference to the third aspect, in a second possible implementation manner of the third aspect, the first data transmission module includes:

a second receiving unit, configured to receive first user plane data sent by a serving gateway SGW; and a second processing unit, configured to encapsulate the first user plane data with an IPv6 header or an IPv4 header, and send the encapsulated first user plane data to the radio access network node; or a second receiving unit, configured to receive second user plane data sent by the radio access network node; and a second processing unit, configured to decapsulate the second user plane data to remove an IPv6 header or an IPv4 header, and forward the decapsulated second user plane data to the SGW.

With reference to the second possible implementation manner of the third aspect, in a third possible implementation manner of the third aspect, when the user plane protocol stack uses a flow label to carry a user plane TEID, the second processing unit encapsulates the first user plane data with an IPv6 header, where a flow label of the IPv6 header carries the first bearer identity;

when the user plane protocol stack uses a next-hop header to carry a type identifier of the GTP-U header, the second processing unit encapsulates the first user plane data with an IPv6 header, where a next-hop header of the IPv6 header carries the type identifier of the GTP-U header; or when the user plane protocol stack uses a protocol type to carry a type identifier of the GTP-U header, the second processing unit encapsulates the first user plane data with an IPv4 header, where a protocol type of the IPv4 header carries the type identifier of the GTP-U header.

According to a fourth aspect, an evolved NodeB is provided, where the evolved NodeB includes:

a second communication connection module, configured to set up a radio access bearer connection with a core network node; and a second data transmission module, configured to perform user plane data transmission with the core network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

With reference to the fourth aspect, in a first possible implementation manner of the fourth aspect, the second communication connection module includes:

a third receiving unit, configured to receive a radio access bearer E-RAB setup request sent by the core network node, wherein when the user plane protocol stack uses a flow label to carry a user plane TEID, the E-RAB setup request includes an interface flow label S1_FL, where the interface flow label carries a first bearer identity that is allocated to a user plane TEID of the E-RAB; and a third processing unit, configured to allocate a second bearer identity to the user plane TEID of the E-RAB, record a mapping relationship between the first bearer identity and the second bearer identity, construct an E-RAB setup response by using the second bearer identity, and send the response to the core network node.

With reference to the fourth aspect, in a second possible implementation manner of the fourth aspect, the second data transmission module includes:

a fourth receiving unit, configured to receive first user plane data sent by the core network node; and a fourth processing unit, configured to decapsulate the first user plane data to remove an IPv6 header or an IPv4 header, and forward the decapsulated first user plane data to a user equipment UE; or a fourth receiving unit, configured to receive second user plane data sent by a user equipment UE; and a fourth processing unit, configured to encapsulate the second user plane data with an IPv6 header or an IPv4 header, and send the encapsulated second user plane data to the core network node.

With reference to the second possible implementation manner of the fourth aspect, in a third possible implementation manner of the fourth aspect, when the user plane protocol stack uses a flow label to carry a user plane TEID, the fourth processing unit encapsulates the second user plane data with an IPv6 header, where a flow label of the IPv6 header carries the second bearer identity;

when the user plane protocol stack uses a next-hop header to carry a type identifier of the GTP-U header, the fourth processing unit encapsulates the second user plane data with an IPv6 header, where a next-hop header of the IPv6 header carries the type identifier of the GTP-U header; or when the user plane protocol stack uses a protocol type to carry a type identifier of the GTP-U header, the fourth processing unit encapsulates the second user plane data with an IPv4 header, where a protocol type of the IPv4 header carries the type identifier of the GTP-U header.

According to a fifth aspect, a network system is further provided, wherein the system includes a mobility management entity and an evolved NodeB, where after the mobility management entity sets up a radio access bearer connection with the evolved NodeB, user plane data transmission is performed by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

According to a sixth aspect, a mobility management entity is further provided, where the mobility management entity includes:

a radio network interface;
a processor;
a memory; and
an application program physically stored in the memory, where the application program includes instructions that can be used to enable the processor and the entity to execute the following processes:

setting up a radio access bearer connection with a radio access network node; and performing user plane data transmission with the radio access network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

According to a seventh aspect, an evolved NodeB is provided, where the evolved NodeB includes:

a radio network interface;
a processor;
a memory; and
an application program physically stored in the memory, where the application program includes instructions that can be used to enable the processor and the NodeB to execute the following processes:

setting up a radio access bearer connection with a core network node; and performing user plane data transmission with the core network node by using a user plane protocol stack, where the user plane protocol stack includes a physical layer, a data link layer, and a network layer, where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer, where the network layer includes an IPv6 header or an IPv4 header, where a next-hop header of the basic IPv6 header or a protocol type of the IPv4 header carries a type identifier of the GTP-U header.

In the user plane data transmission method, the mobility management entity, the evolved NodeB, and the system that are provided by the present invention, a flow label (Flow Label, FL) field of a basic IPv6 header is used to identify tunnel identifier TEID information, so as to omit a UDP header and a GTP-U header in a wireless user data packet; or a new type is added to a next-hop header of a basic IPv6 header to identify a GTP-U header, so as to reduce processing at a UDP layer and/or of the GTP-U tunneling protocol, thereby reducing overheads of network transmission, increasing proportion of user payload, saving interface bandwidth of user plane data services, improving service plane transmission efficiency of radio access, reducing complexity of a user data processing device, and improving processing efficiency.

DESCRIPTION OF EMBODIMENTS

The following further describes the technical solutions of the present invention in detail with reference to accompanying drawings and embodiments.

In System Architecture Evolution (System Architecture Evolution, SAE)/Long Term Evolution (Long Term Evolution, LTE), a core network node is a mobility management entity (Mobility Management Entity, MME), and a RAN node is an evolved NodeB (evolved Node B, eNB). In a Universal Mobile Telecommunications System (Universal Mobile Telecommunications System, UMTS) network, a core network node is a serving general packet radio service (General Packet Radio Service, GPRS) support node (Serving GPRS Support Node, SGSN) or a mobile switching center (Mobile Switching Center, MSC), and a RAN node is a radio network controller (Radio Network Controller, RNC) or a radio base station NodeB.

The present invention is applicable to a wireless communications network system and particularly applicable to a communications network system that uses the GTP-U tunneling protocol to perform data transmission, and is used for user plane data transmission in the GPRS Tunneling Protocol GTP. A mobility management entity in the present invention may be a mobility management entity MME, a serving GPRS support node SGSN, a mobile switching center MSC, or the like. A radio access network node may be an evolved NodeB eNB, a radio network controller RNC, or the like.

In the following embodiments, a mobility management entity MME and an evolved NodeB eNB in SAE/LTE are respectively used as examples of the mobility management entity and the radio access network node, without limiting the present invention to an SAE/LTE system. A user equipment UE is connected to a core network by using an eNB, the eNB is connected to an MME in the core network by using an S1 interface, and the MME is connected to a serving gateway SGW.

Embodiment 1

Figure 1:
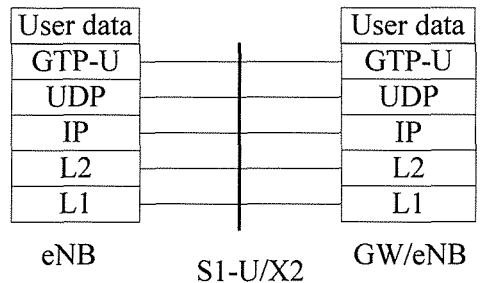
FIG. 1 is a schematic diagram of a format of an existing user plane protocol stack.
Figure 2:
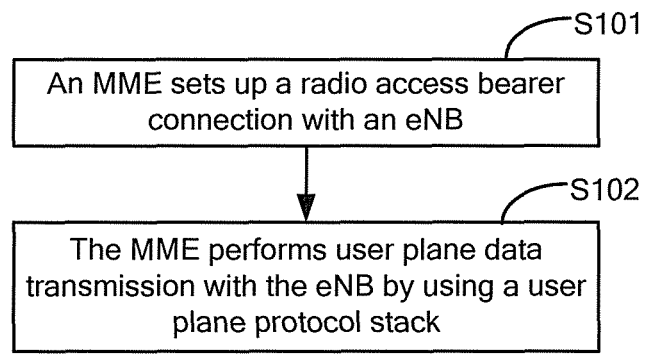
FIG. 2 is a flowchart of a user plane data transmission method according to Embodiment 1 of the present invention.

FIG. 2 is a flowchart of a user plane data transmission method according to this embodiment. As shown in FIG. 2, the method includes:

Step S101: An MME sets up a radio access bearer connection with an eNB.

In an SAE/LTE architecture, a user plane protocol used by all network element nodes and interfaces between an SGW and an evolved universal terrestrial radio access network (Evolved-Universal Terrestrial Radio Access Network, E-UTRAN) and those between an SGSN and the SGW is the GPRS Tunneling Protocol (GPRS Tunneling Protocol, GTP). Before wireless data transmission is performed, a radio access bearer (E-UTRAN Radio Access Bearer, E-RAB) connection needs to be set up between the MME and the eNB. A specific setup process is described in detail in subsequent content with reference to FIG. 5.

Step S102: The MME performs user plane data transmission with the eNB by using a user plane protocol stack.

Figure 3A:
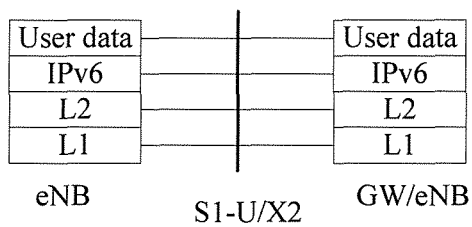
FIG. 3a is a schematic diagram of a format of a user plane protocol stack according to Embodiment 1 of the present invention.

FIG. 3 is a schematic diagram of a format of a user plane protocol stack according to this embodiment. As shown in FIG. 3a, the user plane protocol stack for an MME includes a physical layer (layer L1), a data link layer (layer L2), a network layer (IP layer), and transmitted user data (User Data).

The IPv6 protocol is used at the network layer, including information about an IPv6 header, where a flow label of the IPv6 header carries a user plane tunnel endpoint identifier TEID.

A flow label (Flow Label, FL) field of the IPv6 header has 20 bits, and is used to identify packets that belong to a same traffic flow. One traffic flow may be uniquely identified by using a flow label, a source IP address, and a destination IP address. A router device does not change this field in a packet in a forwarding process, and therefore this field may be used to transfer information, such as the TEID, from end to end.

In the present invention, a flow label of an IPv6 header is used to identify a user plane TEID, so as to omit a GTP-U header and a UDP header; during user plane data transmission, this can reduce overheads of network transmission, increase proportion of user payload, and reduce complexity of a user data processing device. A specific process of data transmission is described in detail with reference to FIG. 6.

Figure 4:
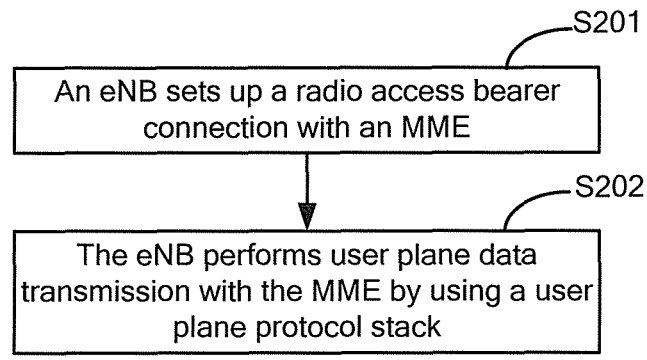
FIG. 4 is a flowchart of another user plane data transmission method according to Embodiment 1 of the present invention.

FIG. 4 is a flowchart of another user plane data transmission method according to this embodiment of the present invention. As shown in FIG. 4, the method includes:

Step S201: An eNB sets up a radio access bearer connection with an MME.

Figure 5:
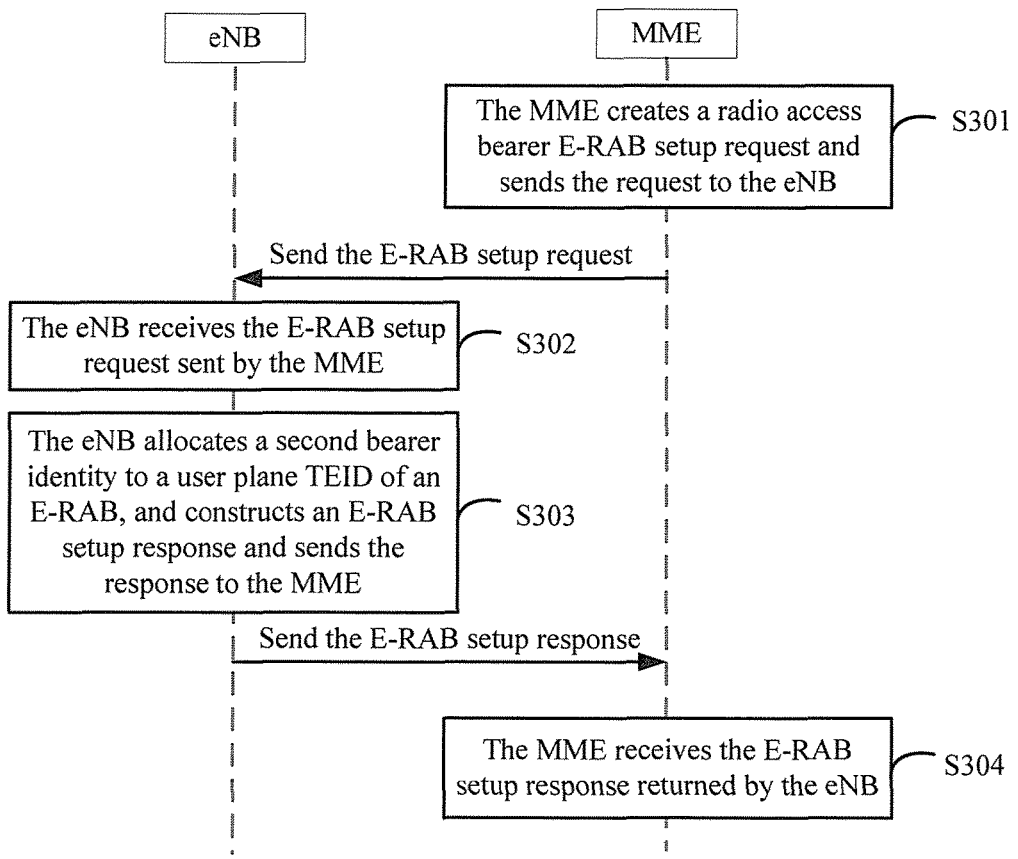
FIG. 5 is a diagram of signaling, provided by Embodiment 1 of the present invention, for a process of E-RAB setup between an MME and an eNB.

A specific setup process is described in detail in subsequent content with reference to FIG. 5.

Step S202: The eNB performs user plane data transmission with the MME by using a user plane protocol stack.

As shown in FIG. 3*a*, like a user plane protocol stack for an MME, a user plane protocol stack for an eNB includes a physical layer (layer L1), a data link layer (layer L2), and a network layer (IP layer); the network layer includes information about an IPv6 header, where a flow label of the IPv6 header carries a user plane tunnel endpoint identifier TEID.

FIG. 5 is a diagram of signaling, provided by this embodiment, for a process of E-RAB setup between an MME and an eNB. As shown in FIG. 5, the setup process includes:

Step S301: The MME creates a radio access bearer E-RAB setup request and sends the request to the eNB.

The MME is connected to the eNB by using an S1 interface. The E-RAB setup request includes an interface flow label S1_FL, where the interface flow label carries a first bearer identity that is allocated by the MME to a user plane TEID of the E-RAB. The MME allocates one unique first bearer identity to each E-RAB, and uses the allocated first bearer identity as a value of the interface flow label S1_FL in the S1 Application Protocol (S1AP). The MME records a correspondence between the first bearer identity allocated to the TEID and the TEID, and creates an uplink tunnel table of the E-RAB in the MME. For example, the first bearer identity that is allocated by the MME to the E-RAB is 1355, and then an uplink tunnel table of the first bearer identity 1355 is created in the MME. The E-RAB setup request is constructed by using information such as the first bearer identity, evolved packet system bearer quality of service (Evolved Packet System Bearer Qos, EPS Bearer Qos), and a transmission interface IP address and is sent to the eNB.

Figure 3B:
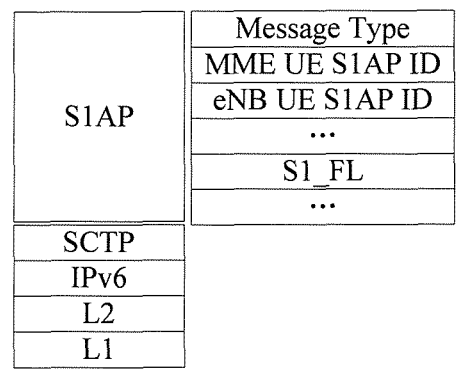
FIG. 3b shows a signaling data format that is provided by Embodiment 1 of the present invention and used when an E-RAB is set up between an MME and an eNB.

FIG. 3*b* shows a signaling data format that is used when an E-RAB is set up between an MME and an eNB. The signaling data format is used by both an E-RAB setup request and an E-RAB setup response. As shown in FIG. 3*b*, the signaling data format includes layer L1, layer L2, an IPv6 layer, a Stream Control Transmission Protocol layer (Stream Control Transmission Protocol, SCTP), and an S1 Application Protocol (S1 Application Protocol, S1AP) layer, where S1AP includes an S1 flow label (S1_FL), a user encapsulation type (Message Type), a UE identity at the S1 interface in the MME (MME UE S1AP ID), a UE identity at an S1 interface in the eNB (eNB UE S1AP ID), and the like. The S1_FL is used to transfer the first bearer identity that is allocated by the MME to the E-RAB or a second bearer identity that is allocated by the eNB to the E-RAB; the user encapsulation type may include E-RAB setup request (E-RAB setup request), E-RAB setup response (E-RAB setup response), E-RAB delete request (E-RAB delete request), E-RAB delete response (E-RAB delete response), and the like. The S1_FL is used to replace a GTP-TEID in the existing S1AP. Generally, the S1_FL has 24 bits, while the GTP-TEID has 32 bits. Therefore, overheads of network transmission can be reduced.

Step S302: The eNB receives the E-RAB setup request sent by the MME.

Information such as the interface flow label S1_FL is extracted from the E-RAB setup request, the first bearer identity that is allocated by the MME to the user plane TEID of the E-RAB is acquired, and an uplink tunnel table of the E-RAB in the eNB is created by using the first bearer identity. If the first bearer identity that is allocated by the MME to the E-RAB is 1355, an uplink tunnel table of the first bearer identity 1355 is created in the eNB.

Step S303: The eNB allocates a second bearer identity to a user plane TEID of an E-RAB, and constructs an E-RAB setup response and sends the response to the MME.

The second bearer identity that is allocated by the eNB to the user plane TEID of the E-RAB may be the same as or may be different from the first bearer identity allocated by the MME. For example, the first bearer identity that is allocated by the MME to the E-RAB is 1355, and the second bearer identity that is allocated by the eNB to the E-RAB may be 1455. It should be noted that the first bearer identity and the second bearer identity are independent from each other. Even if a first bearer identity and a second bearer identity that have a same numeric value are used, the first bearer identity and the second bearer identity are used in specific operations on the MME and the eNB respectively.

The eNB records a mapping relationship between the first bearer identity and the second bearer identity, and creates a downlink tunnel table of the E-RAB in the eNB. If the second bearer identity that is allocated by the eNB to the E-RAB is 1455, a downlink tunnel table of the second bearer identity 1455 is created in the eNB. The E-RAB setup response is constructed by using information such as the allocated second bearer identity and radio bearer Qos, and is sent to the MME.

Step S304: The MME receives the E-RAB setup response returned by the eNB.

The second bearer identity that is allocated by the radio access network node to the user plane TEID of the E-RAB is extracted according to the E-RAB setup response, the mapping relationship between the first bearer identity and the second bearer identity is recorded, and a downlink tunnel table of the E-RAB in the MME is created. If the second bearer identity that is allocated by the eNB to the E-RAB is 1455, a downlink tunnel table of the second bearer identity 1455 is created in the MME.

In this way, the process of the E-RAB setup between the eNB and the MME is complete.

Figure 6:
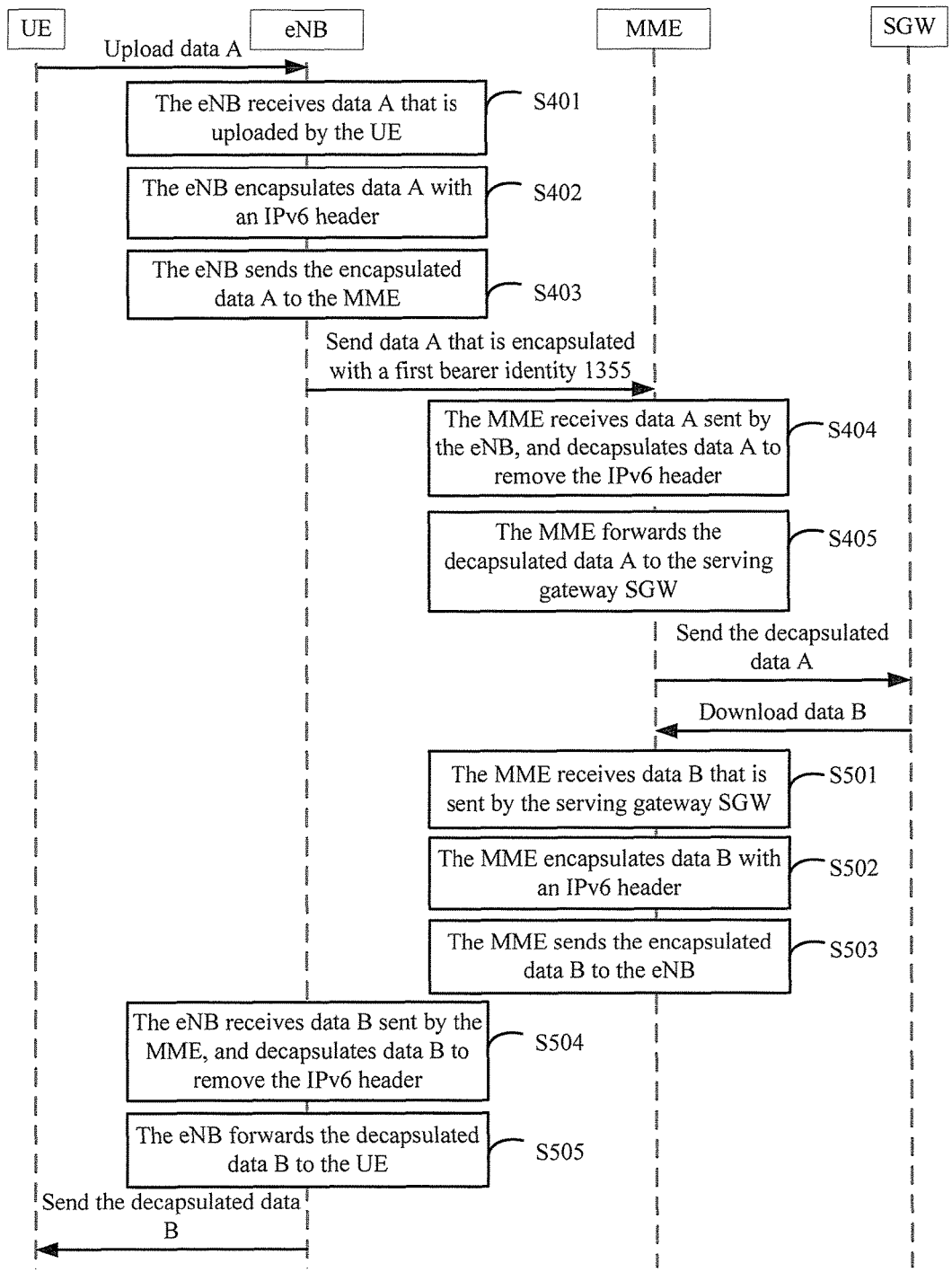
FIG. 6 is a diagram of signaling, provided by Embodiment 1 of the present invention, for user plane data transmission between an MME and an eNB.

FIG. 6 is a diagram of signaling, provided by this embodiment, for user plane data transmission between an MME and an eNB. As shown in FIG. 6, a process of the user plane data transmission includes a process of data uploading by a UE and a process of data downloading by the UE.

The process of the data uploading by the UE includes:

Step S401: The eNB receives data A that is uploaded by the UE.

Data A is transmitted by using the format of the user plane protocol stack shown in FIG. 3*a*.

Step S402: The eNB encapsulates data A with an IPv6 header.

The eNB searches an uplink tunnel table of a first bearer identity 1355 in the eNB, encapsulates data A with an IPv6 header by using information in the uplink tunnel table of the first bearer identity, where a flow label of the IPv6 header carries the first bearer identity 1355.

Step S403: The eNB sends the encapsulated data A to an MME.

The eNB sends data A that is encapsulated with the first bearer identity 1355 to the MME.

Step S404: The MME receives data A sent by the eNB, and decapsulates data A to remove the IPv6 header.

The MME searches an uplink tunnel table of the first bearer identity 1355 in the MME, and performs decapsulation processing to obtain data A sent by the UE.

Step S405: The MME forwards the decapsulated data A to a serving gateway SGW.

Then, the SGW can receive data A sent by the UE.

The process of the data downloading by the UE includes:

Step S501: The MME receives data B that is sent by the serving gateway SGW.

Data B is also transmitted by using the format of the user plane protocol stack shown in FIG. 3a.

Step S502: The MME encapsulates data B with an IPv6 header.

The MME searches a downlink tunnel table of a second bearer identity 1455 in the MME, encapsulates data B with an IPv6 header by using information in the downlink tunnel table of the second bearer identity 1455, where a flow label of the IPv6 header carries the second bearer identity 1455.

Step S503: The MME sends the encapsulated data B to the eNB.

The MME sends data B that is encapsulated with the second bearer identity 1455 to the eNB.

Step S504: The eNB receives data B sent by the MME, and decapsulates data B to remove the IPv6 header.

The eNB searches a downlink tunnel table of the second bearer identity 1455 in the eNB, and performs decapsulation processing to obtain data B sent by the SGW.

Step S505: The eNB forwards the decapsulated data B to the UE.

Then, the UE can receive data B sent by the SGW.

In the user plane data transmission method provided by this embodiment of the present invention, a Flow Label field of a basic IPv6 header is used to identify tunnel identifier TEID information, so as to omit a UDP header and a GTP-U header in a wireless user data packet and reduce processing at a UDP layer and of the GTP-U tunneling protocol, thereby reducing overheads of network transmission, increasing proportion of user payload, saving interface bandwidth of user plane data services, improving service plane transmission efficiency of radio access, reducing complexity of a user data processing device, and improving processing efficiency.

Embodiment 2

Figure 7A:
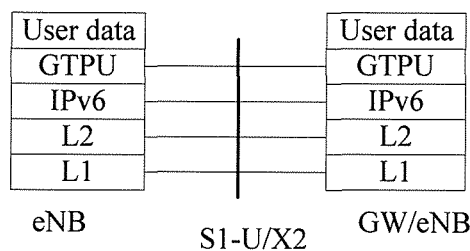
FIG. 7a is a schematic diagram of a format of a user plane protocol stack according to Embodiment 2 of the present invention.

FIG. 7a is a schematic diagram of a format of a user plane protocol stack according to this embodiment. As shown in FIG. 7a, the user plane protocol stack for an MME includes a physical layer (layer L1), a data link layer (layer L2), a network layer (IP layer), a GPRS Tunneling Protocol-User plane layer (GTP-U), and transmitted user data (User Data).

When data transmission is performed by using the IPv6 protocol, the network layer includes an IPv6 header, where a next-hop header of the IPv6 header carries a type identifier of the GTP-U header.

When data transmission is performed by using the IPv4 protocol, the network layer includes an IPv4 header, where a protocol type of the IPv4 header carries the type identifier of the GTP-U header.

The type identifier of the GTP-U header is a preset numeric value. In this embodiment of the present invention, its value is 101, which is used to indicate the type identifier of the GTP-U header. That is, a value of the next-hop header of the IPv6 header or the protocol type of the IPv4 header is 101.

Similar to Embodiment 1, a user plane data transmission method according to this embodiment includes steps of setting up a radio access bearer E-RAB connection between an MME and an eNB, and performing user plane data transmission with the radio access network node by using the user plane protocol stack.

A process, provided by this embodiment, of E-RAB setup between the MME and the eNB is similar to steps S301 to S304 in Embodiment 1, and an only difference is that different signaling data formats are used.

Figure 7B:
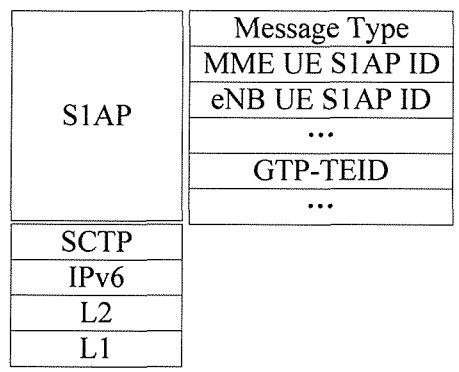
FIG. 7b shows a signaling data format that is provided by Embodiment 2 of the present invention and used when an E-RAB is set up between an MME and an eNB.

In this embodiment, because the user plane protocol stack includes GTP-U information, when the E-RAB connection is set up, a signaling data format used is the same as that in an existing manner. As shown in FIG. 7b, the signaling data format includes layer L1, layer L2, an IPv6 layer, a Stream Control Transmission Protocol layer (SCTP), and an S1 Application Protocol (S1AP) layer, where S1AP includes a GTP-TEID, a Message Type, an MME UE S1AP ID, an eNB UE S1AP ID, and the like. The GTP-TEID is a user plane tunnel endpoint identifier TEID, and an E-RAB is set up by using the user plane TEID.

Figure 8:
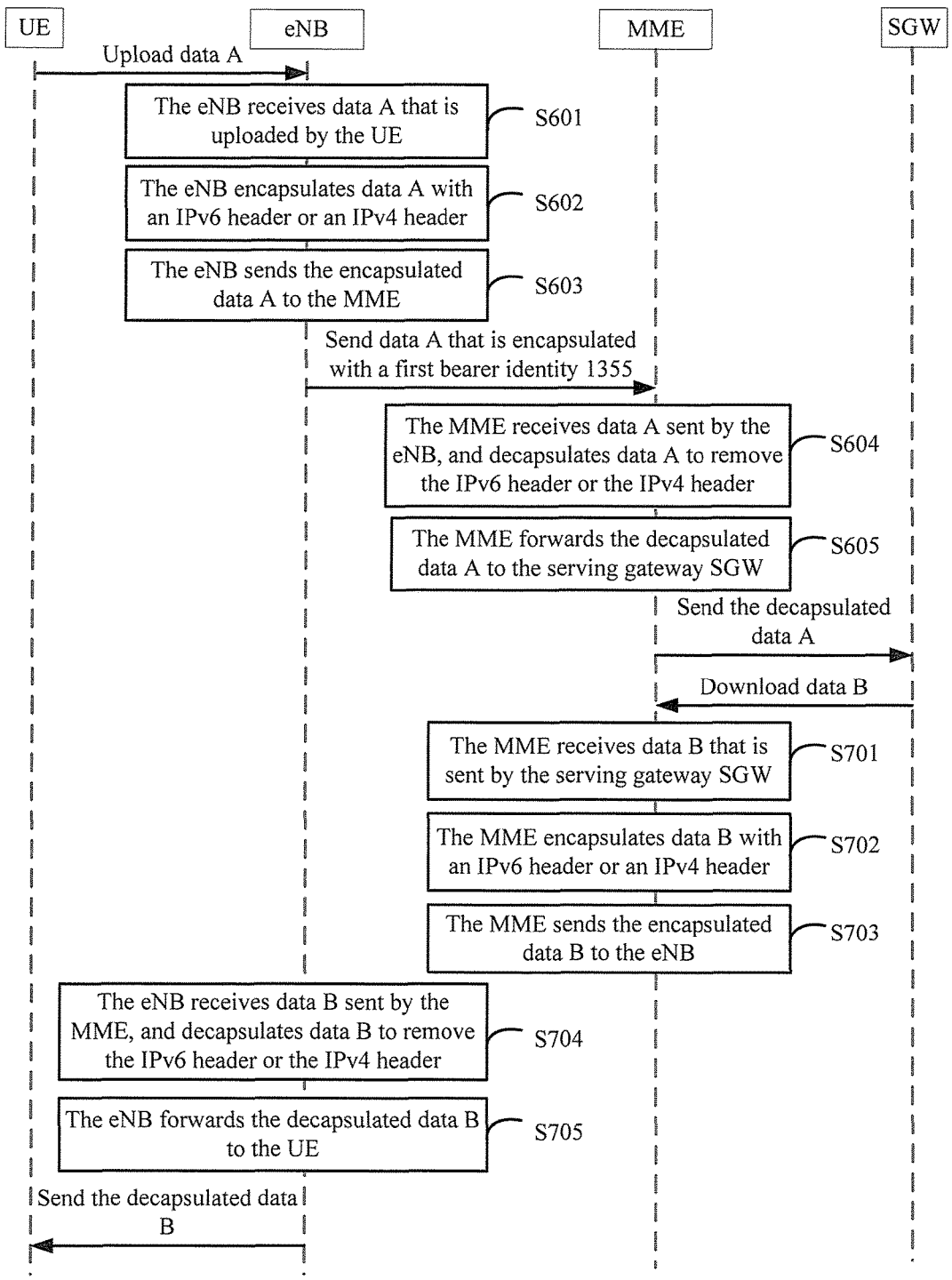
FIG. 8 is a diagram of signaling, provided by Embodiment 2 of the present invention, for user plane data transmission between an MME and an eNB.

FIG. 8 is a diagram of signaling, provided by this embodiment, for user plane data transmission between an MME and an eNB. As shown in FIG. 8, a process of the user plane data transmission includes a process of data uploading by a UE and a process of data downloading by the UE.

The process of the data uploading by the UE includes:

Step S601: The eNB receives data A that is uploaded by the UE.

Data A is transmitted by using the format of the user plane protocol stack shown in FIG. 7a.

Step S602: The eNB encapsulates data A with an IPv6 header or an IPv4 header.

The eNB searches an uplink tunnel table of a first bearer identity 1355 in the eNB.

When the user plane protocol stack uses a next-hop header to carry a type identifier of the GTP-U header, data A is encapsulated with an IPv6 header by using information in the uplink tunnel table of the first bearer identity, where a value of a next-hop header of the IPv6 header is 101, and the GTP-U carries the first bearer identity 1355.

When the user plane protocol stack uses a protocol type to carry the type identifier of the GTP-U header, data A is encapsulated with an IPv4 header by using the information in the uplink tunnel table of the first bearer identity, where a value of a protocol type of the IPv4 header is 101, and the GTP-U carries the first bearer identity 1355.

Step S603: The eNB sends the encapsulated data A to the MME.

The eNB sends data A that is encapsulated with the first bearer identity 1355 to the MME.

Step S604: The MME receives data A sent by the eNB, and decapsulates data A to remove the IPv6 header or the IPv4 header.

The MME searches an uplink tunnel table of the first bearer identity 1355 in the MME, and performs decapsulation processing to obtain data A sent by the UE.

Step S605: The MME forwards the decapsulated data A to a serving gateway SGW.

The process of the data downloading by the UE includes:

Step S701: The MME receives data B that is sent by the serving gateway SGW.

Data B is also transmitted by using the format of the user plane protocol stack shown in FIG. 7a.

Step S702: The MME encapsulates data B with an IPv6 header or an IPv4 header.

The MME searches a downlink tunnel table of a second bearer identity 1455 in the MME.

When the user plane protocol stack uses a next-hop header to carry the type identifier of the GTP-U header, data B is encapsulated with an IPv6 header by using information in the downlink tunnel table of the second bearer identity 1455, where a value of a next-hop header of the IPv6 header is 101, and the GTP-U carries the second bearer identity 1455.

When the user plane protocol stack uses a protocol type to carry the type identifier of the GTP-U header, data B is encapsulated with an IPv4 header by using the information in the downlink tunnel table of the second bearer identity 1455, where a value of a protocol type of the IPv4 header is 101, and the GTP-U carries the second bearer identity 1455.

Step S703: The MME sends the encapsulated data B to the eNB.

The MME sends data B that is encapsulated with the second bearer identity 1455 to the eNB.

Step S704: The eNB receives data B sent by the MME, and decapsulates data B to remove the IPv6 header or the IPv4 header.

The eNB searches a downlink tunnel table of the second bearer identity 1455 in the eNB, and performs decapsulation processing to obtain data B sent by the SGW.

Step S705: The eNB forwards the decapsulated data B to the UE.

In the user plane data transmission method provided by this embodiment of the present invention, a next-hop header of a basic IPv6 header or a protocol type of an IPv4 header is used to identify a GTP-U type, so as to omit a UDP header in a wireless user data packet and reduce processing at a UDP layer, thereby reducing overheads of network transmission, and increasing proportion of user payload.

The foregoing describes in detail the user plane data transmission methods provided by the present invention, and the following describes in detail a mobility management entity, an evolved NodeB, and a system that are provided by the present invention.

Embodiment 3

Figure 9:
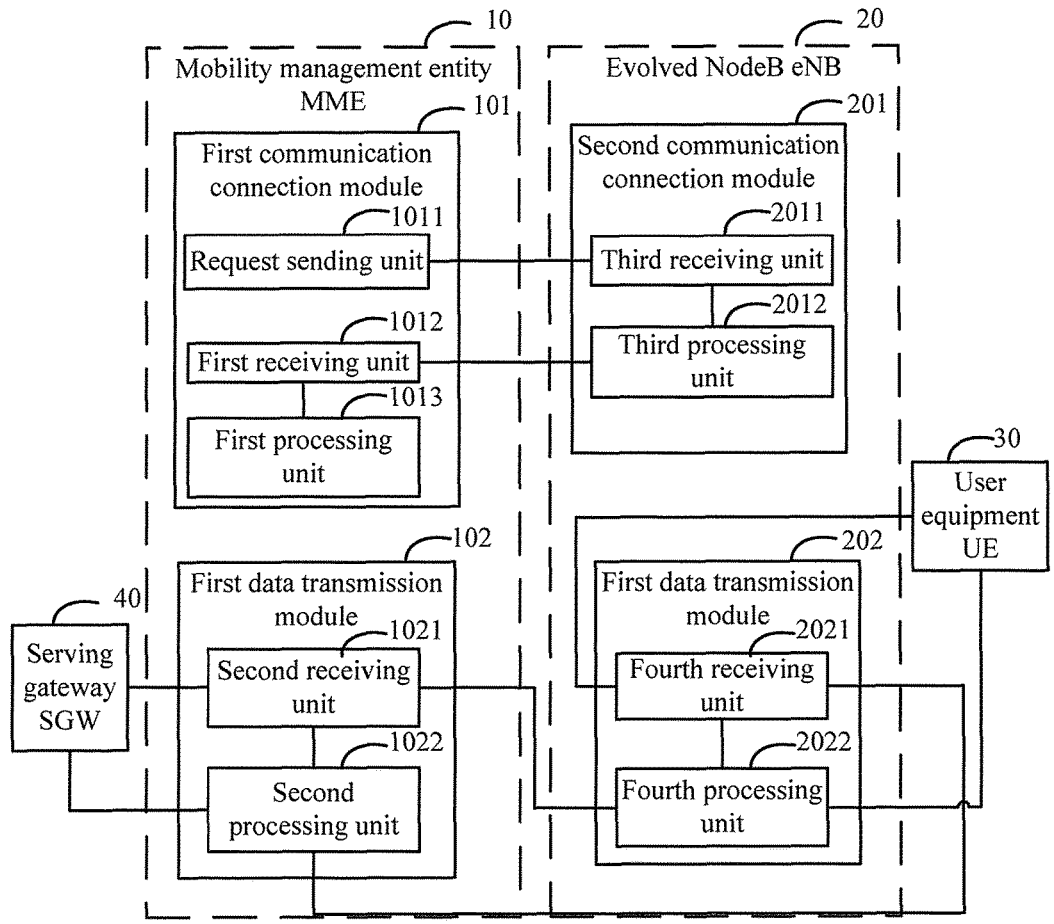
FIG. 9 is a schematic diagram of a radio access network system according to Embodiment 3 of the present invention.

FIG. 9 is a schematic diagram of a radio access network system according to this embodiment. As shown in FIG. 9, the system includes a mobility management entity 10 and an evolved NodeB 20, which are configured to set up a wireless communication connection between a user equipment UE 30 and a serving gateway SGW 40.

After the mobility management entity 10 and the evolved NodeB 20 set up a radio access bearer connection, user plane data transmission is performed by using the user plane protocol stack shown in FIG. 3a or FIG. 7a.

The mobility management entity 10 includes a first communication connection module 101 and a first data transmission module 102.

The first communication connection module 101 is configured to set up a radio access bearer connection with the evolved NodeB 20. The first data transmission module 102 is configured to perform user plane data transmission with the evolved NodeB 20 by using the user plane protocol stack.

The evolved NodeB 20 includes a first communication connection module 201 and a first data transmission module 202.

The second communication connection module 201 is configured to set up a radio access bearer connection with the mobility management entity 10. The second data transmission module 202 is configured to perform user plane data transmission with the mobility management entity 10 by using the user plane protocol stack.

The first communication connection module 101 includes a request sending unit 1011, a first receiving unit 1012, and a first processing unit 1023. The second communication connection module 201 includes a third receiving unit 2011 and a third processing unit 2012.

The request sending unit 1011 is configured to create a radio access bearer E-RAB setup request and send the request to the third receiving unit 2011 of the evolved NodeB 20.

If the user plane protocol stack shown in FIG. 3a is used, the E-RAB setup request includes an interface flow label S1_FL, where the interface flow label carries a first bearer identity that is allocated by the first processing unit 1023 to a user plane TEID of the E-RAB. If the user plane protocol stack shown in FIG. 7a is used, the E-RAB setup request includes a GTP-TEID, which is used to identify a user plane tunnel endpoint identifier TEID of the E-RAB.

The third receiving unit 2011 is configured to receive the E-RAB setup request sent by the request sending unit 1011.

The third processing unit 2012 is configured to allocate a second bearer identity to the user plane TEID of the E-RAB, record a mapping relationship between the first bearer identity and the second bearer identity, construct an E-RAB setup response by using the second bearer identity, and send the response to the first receiving unit 1012.

The first receiving unit 1012 is configured to receive the E-RAB setup response that is returned by third processing unit 2012 with respect to the E-RAB setup request.

The first processing unit 1013 is configured to extract, according to the E-RAB setup response, the second bearer identity that is allocated by the third processing unit 2012 to the user plane TEID of the E-RAB, and record the mapping relationship between the first bearer identity and the second bearer identity.

The first data transmission module 102 includes a second receiving unit 1021 and a second processing unit 1022. The second data transmission module 202 includes a fourth receiving unit 2021 and a fourth processing unit 2022.

If user plane data is transmitted from the serving gateway 40 to the user equipment 30, the second receiving unit 1021 is configured to receive first user plane data sent by the serving gateway SGW. The second processing unit 1022 is configured to encapsulate the first user plane data with an IPv6 header or an IPv4 header, and send the encapsulated first user plane data to the second receiving unit 1021 of the evolved NodeB 20.

When the user plane protocol stack uses a flow label to carry a user plane TEID, the second processing unit 1022 encapsulates the first user plane data with an IPv6 header, where a flow label of the IPv6 header carries the first bearer identity. When the user plane protocol stack uses a next-hop header to carry a type identifier of the GTP-U header, the second processing unit 1022 encapsulates the first user plane data with an IPv6 header, where a next-hop header of the IPv6 header carries the type identifier of the GTP-U header.

When the user plane protocol stack uses a protocol type to carry the type identifier of the GTP-U header, the second processing unit 1022 encapsulates the first user plane data with an IPv4 header, where a protocol type of the IPv4 header carries the type identifier of the GTP-U header.

The fourth receiving unit 2021 is configured to receive the first user plane data sent by the second processing unit 1021. The fourth processing unit 2022 is configured to decapsulate the first user plane data to remove the IPv6 header or the IPv4 header, and forward the decapsulated first user plane data to the user equipment UE.

If user plane data is transmitted from the user equipment 30 to the serving gateway 40, the fourth receiving unit 2022 is configured to receive second user plane data sent by the user equipment UE. The fourth processing unit 2022 is configured to encapsulate the second user plane data with an IPv6 header or an IPv4 header, and send the encapsulated second user plane data to the second receiving unit 1021.

When the user plane protocol stack uses a flow label to carry a user plane TEID, the fourth processing unit 2022 encapsulates the second user plane data with an IPv6 header, where a flow label of the IPv6 header carries the second bearer identity. When the user plane protocol stack uses a next-hop header to carry a type identifier of the GTP-U header, the fourth processing unit 2022 encapsulates the second user plane data with an IPv6 header, where a next-hop header of the IPv6 header carries the type identifier of the GTP-U header. When the user plane protocol stack uses a protocol type to carry the type identifier of the GTP-U header, the fourth processing unit 2022 encapsulates the second user plane data with an IPv4 header, where a protocol type of the IPv4 header carries the type identifier of the GTP-U header.

The second receiving unit 1021 is configured to receive the second user plane data sent by the fourth processing unit 2022. The second processing unit 1023 is configured to decapsulate the second user plane data to remove the IPv6 header or the IPv4 header, and forward the decapsulated second user plane data to the serving gateway 40.

Embodiment 4

Figure 10:
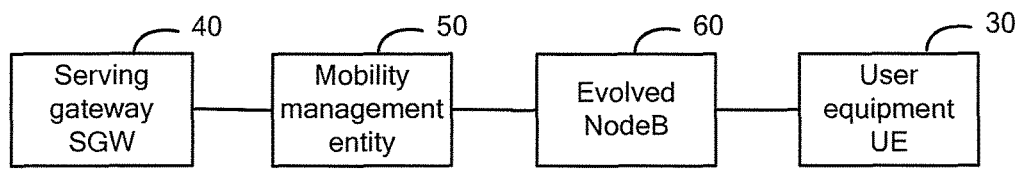
FIG. 10 is a schematic diagram of a radio access network system according to Embodiment 4 of the present invention.

FIG. 10 is a schematic diagram of a radio access network system according to this embodiment. As shown in FIG. 10, the system includes a mobility management entity 50 and an evolved NodeB 60, which are configured to set up a wireless communication connection between a user equipment UE 30 and a serving gateway SGW 40.

Figure 11:
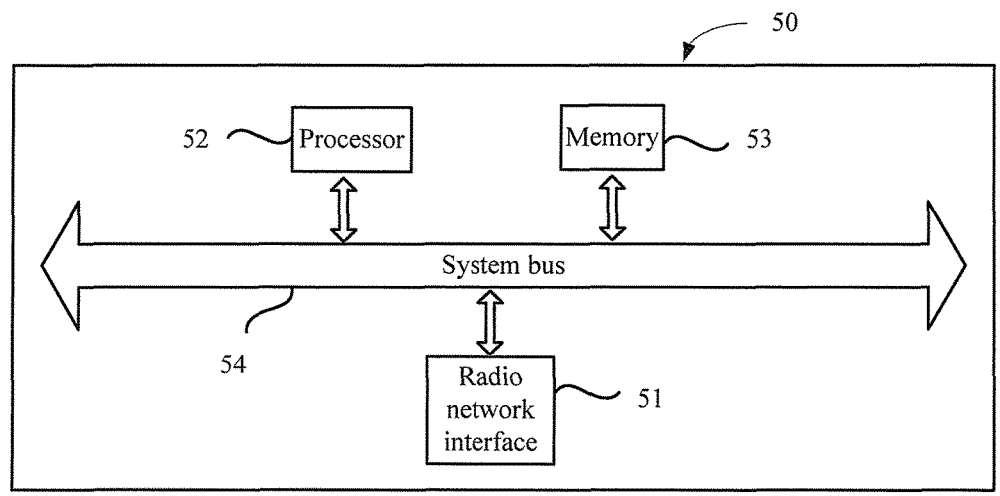
FIG. 11 is a schematic diagram of a mobility management entity according to Embodiment 4 of the present invention.

FIG. 11 is a schematic diagram of the mobility management entity according to this embodiment. As shown in FIG. 11, the mobility management entity includes a radio network interface 51, a processor 52, and a memory 53. A system bus 54 is configured to connect the radio network interface 51, the processor 52, and the memory 53.

The radio network interface 51 is configured to communicate with the evolved NodeB 60 and the serving gateway 40.

The memory 53 may be a permanent memory, for example, a hard disk drive and a flash memory, and the memory 53 has software modules and device drivers. The software modules can execute the functional modules in the foregoing methods of the present invention; the device drivers may be network and interface drivers.

Upon startup of the mobility management entity, these software components are loaded to the memory 53 and then are accessed by the processor 52, and the processor 52 executes the following instructions:

setting up a radio access bearer connection with a radio access network node; and performing user plane data transmission with the radio access network node by using a user plane protocol stack, where the user plane protocol stack includes a physical layer (layer L1), a data link layer (layer L2), and a network layer (IP layer), where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer (GTP-U), where the network layer includes an IPv6 header or an IPv4 header, where a next-hop header of the basic IPv6 header or a protocol type of the IPv4 header carries a type identifier of the GTP-U header.

In the mobility management entity according to this embodiment, a flow label field of a basic IPv6 header or a next-hop header is used to identify a user ID, so as to omit a GTP-U header and/or a UDP header used for user data transmission, thereby reducing overheads of network transmission, increasing proportion of user payload, and reducing complexity of a user data processing device.

Further, when the user plane protocol stack uses a flow label to carry a user plane TEID, after the processor accesses the software components in the memory 53, the processor executes the following instructions:

creating a radio access bearer E-RAB setup request and sending the request to the radio access network node, where the E-RAB setup request includes an interface flow label S1_FL, where the interface flow label carries a first bearer identity that is allocated to a user plane TEID of the E-RAB; and receiving an E-RAB setup response that is returned by the radio access network node with respect to the E-RAB setup request, extracting, from the E-RAB setup response, a second bearer identity that is allocated by the radio access network node to the user plane TEID of the E-RAB, and recording a mapping relationship between the first bearer identity and the second bearer identity.

The foregoing instruction process is a process applied to setup of an E-RAB connection between the mobility management entity and the evolved NodeB. In signaling data, the interface flow label S1_FL is used to identify the user plane TEID of the E-RAB, so that an uplink/downlink tunnel table is created in the mobility management entity by using the user plane TEID.

Further, after the processor accesses the software components in the memory 53, the processor executes the following instructions:

receiving first user plane data sent by the serving gateway SGW, encapsulating the first user plane data with an IPv6 header or an IPv4 header, and sending the encapsulated first user plane data to the radio access network node; or receiving second user plane data sent by the radio access network node, decapsulating the second user plane data to remove an IPv6 header or an IPv4 header, and forwarding the decapsulated second user plane data to the SGW.

The foregoing instruction process is a process of packet forwarding between the mobility management entity and the evolved NodeB, where data transmission or forwarding is performed by using the user plane protocol stack shown in FIG. 3a or FIG. 7a.

Further, after the processor accesses the software components in the memory 53, the processor executes the following instructions:

when the user plane protocol stack uses a flow label to carry a user plane TEID, encapsulating the first user plane data with an IPv6 header, where a flow label of the IPv6 header carries the second bearer identity;

when the user plane protocol stack uses a next-hop header to carry a type identifier of the GTP-U header, encapsulating the first user plane data with an IPv6 header, where a next-hop header of the IPv6 header carries the type identifier of the GTP-U header; or when the user plane protocol stack uses a protocol type to carry a type identifier of the GTP-U header, encapsulating the first user plane data with an IPv4 header, where a protocol type of the IPv4 header carries the type identifier of the GTP-U header.

The foregoing instruction process is a process in which different encapsulation processing processes are performed for different formats of the user plane protocol stack.

Figure 12:
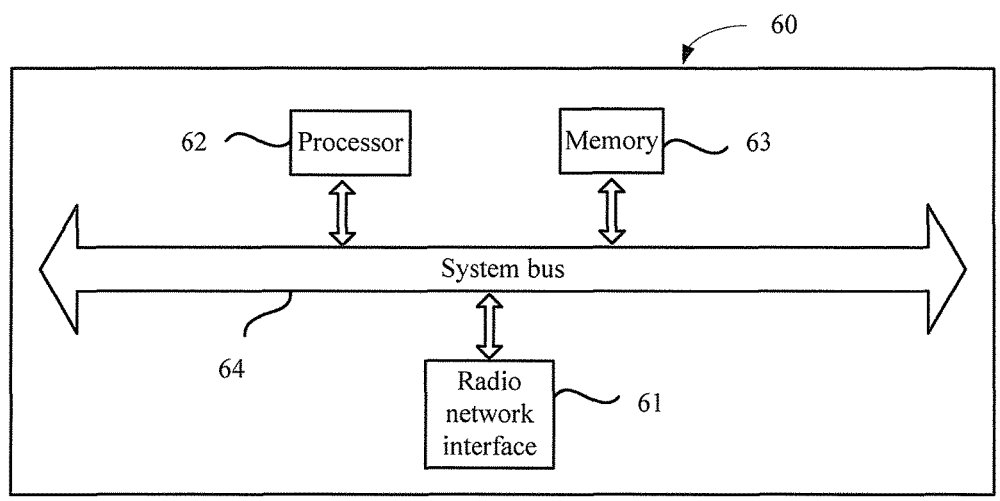
FIG. 12 is a schematic diagram of an evolved NodeB according to Embodiment 4 of the present invention.

FIG. 12 is a schematic diagram of the evolved NodeB according to this embodiment. As shown in FIG. 12, the evolved NodeB includes a radio network interface 61, a processor 62, and a memory 63. A system bus 64 is configured to connect the radio network interface 61, the processor 62, and the memory 63.

The radio network interface 61 is configured to communicate with the mobility management entity 50 and the user equipment 30.

The memory 63 may be a permanent memory, for example, a hard disk drive and a flash memory, and the memory 63 has software modules and device drivers. The software modules can execute the functional modules in the foregoing methods of the present invention; the device drivers may be network and interface drivers.

Upon startup of the evolved NodeB, these software components are loaded to the memory 63 and then are accessed by the processor 62, and the processor 62 executes the following instructions:

setting up a radio access bearer connection with a core network node; and performing user plane data transmission with the core network node by using a user plane protocol stack, where the user plane protocol stack includes a physical layer (layer L1), a data link layer (layer L2), and a network layer (IP layer), where the network layer includes an IPv6 header, where a flow label of the IPv6 header carries a user plane tunnel endpoint identifier TEID; or the user plane protocol stack includes a physical layer, a data link layer, a network layer, and a GPRS Tunneling Protocol-User plane layer (GTP-U), where the network layer includes an IPv6 header or an IPv4 header, where a next-hop header of the basic IPv6 header or a protocol type of the IPv4 header carries a type identifier of the GTP-U header.

In the evolved NodeB according to this embodiment, a flow label field of a basic IPv6 header or a next-hop header is used to identify a user ID, so as to omit a GTP-U header and/or a UDP header used for user data transmission, thereby reducing overheads of network transmission, increasing proportion of user payload, and reducing complexity of a user data processing device.

Further, when the user plane protocol stack uses a flow label to carry a user plane TEID, after the processor accesses the software components in the memory 63, the processor executes the following instructions:

receiving a radio access bearer E-RAB setup request sent by the core network node, where the E-RAB setup request includes an interface flow label S1_FL, where the interface flow label carries a first bearer identity that is allocated to a user plane TEID of the E-RAB; and allocating a second bearer identity to the user plane TEID of the E-RAB, recording a mapping relationship between the first bearer identity and the second bearer identity, constructing an E-RAB setup response by using the second bearer identity, and sending the response to the core network node.

The foregoing instruction process is a process applied to setup of an E-RAB connection between the mobility management entity and the evolved NodeB. In signaling data, the interface flow label S1_FL is used to identify the user plane TEID of the E-RAB, so that an uplink/downlink tunnel table is created in the evolved NodeB by using the user plane TEID.

Further, after the processor accesses the software components in the memory 63, the processor executes the following instructions:

receiving first user plane data sent by the core network node, decapsulating the first user plane data to remove an IPv6 header or an IPv4 header, and forwarding the decapsulated first user plane data to the user equipment UE; or receiving second user plane data sent by the user equipment UE; encapsulating the second user plane data with an IPv6 header or an IPv4 header, where a flow label of the IPv6 header carries the second bearer identity; and sending the encapsulated second user plane data to the core network node.

The foregoing instruction process is a process of packet forwarding between the mobility management entity and the evolved NodeB, where data transmission or forwarding is performed by using the user plane protocol stack shown in FIG. 3a or FIG. 7a.

Further, after the processor accesses the software components in the memory 53, the processor executes the following instructions:

when the user plane protocol stack uses a flow label to carry a user plane TEID, encapsulating the second user plane data with an IPv6 header, where a flow label of the IPv6 header carries the first bearer identity;

when the user plane protocol stack uses a next-hop header to carry a type identifier of the GTP-U header, encapsulating the second user plane data with an IPv6 header, where a next-hop header of the IPv6 header carries the type identifier of the GTP-U header; or when the user plane protocol stack uses a protocol type to carry a type identifier of the GTP-U header, encapsulating the second user plane data with an IPv4 header, where a protocol type of the IPv4 header carries the type identifier of the GTP-U header.

The foregoing instruction process is a process in which different encapsulation processing processes are performed for different formats of the user plane protocol stack.

In the user plane data transmission method, the mobility management entity, the evolved NodeB, and the system that are provided by the present invention, a flow label field of a basic IPv6 header or a next-hop header is used to identify a user ID, so as to omit a GTP-U header and/or a UDP header used for user data transmission, thereby reducing overheads of network transmission, increasing proportion of user payload, and reducing complexity of a user data processing device.

According to experiments, that a flow label Flow Label field of a basic IPv6 header is used to identify a user ID in the present invention can improve service plane transmission efficiency of radio access (a data plane accounts for more than 90% of total radio access bandwidth), and save interface bandwidth of user plane data services. In an LTE scenario, average transmission efficiency of typical services is increased by more than 0.53%; in a UMTS scenario, average transmission efficiency of typical services is increased by more than 8%.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A user plane data transmission method, comprising:
setting up a radio access bearer connection with a radio access network node; and
performing user plane data transmission with the radio access network node by using a user plane protocol stack, wherein the user plane protocol stack comprises a physical layer, a data link layer, and a network layer, wherein the network layer comprises an IPv6 header, and wherein a flow label of the IPv6 header carries a user plane tunnel endpoint identifier (TEID),
wherein setting up the radio access bearer connection with the radio access network node comprises:
creating a radio access bearer setup request and sending the request to the radio access network node, wherein the radio access bearer setup request comprises an interface flow label, wherein the interface flow label carries a first bearer identity that is allocated to a user plane TEID of the radio access bearer; and
receiving an radio access bearer setup response that is returned by the radio access network node with respect to the radio access bearer setup request, extracting, from the radio access bearer setup response, a second bearer identity that is allocated by the radio access network node to the user plane TEID of the radio access bearer, and recording a mapping relationship between the first bearer identity and the second bearer identity.

2. The user plane data transmission method according to claim 1, further comprising encapsulating the first user plane data with the IPv6 header, wherein a flow label of the IPv6 header carries a second bearer identity.

3. A mobility management entity, comprising:
a radio network interface;
a processor;
a memory; and
an application program physically stored in the memory, wherein the application program comprises instructions that can be used to enable the processor to execute the following:
setting up a radio access bearer connection with a radio access network node;
performing user plane data transmission with the radio access network node by using a user plane protocol stack, wherein the user plane protocol stack comprises a physical layer, a data link layer, and a network layer, wherein the network layer comprises an IPv6 header, wherein a flow label of the IPv6 header carries a user plane tunnel endpoint identifier (TEID); creating a radio access bearer setup request and sending the request to the radio access network node, wherein the radio access bearer setup request comprises an interface flow label, wherein the interface flow label carries a first bearer identity that is allocated to a user plane TEID of the radio access bearer; and
receiving an radio access bearer setup response that is returned by the radio access network node with respect to the radio access bearer setup request, extracting, from the radio access bearer setup response, a second bearer identity that is allocated by the radio access network node to the user plane TEID of the radio access bearer, and recording a mapping relationship between the first bearer identity and the second bearer identity.

4. An evolved NodeB, comprising:
a radio network interface;
a processor;
a memory; and
an application program physically stored in the memory, wherein the application program comprises instructions that can be used to enable the processor to execute the following:

setting up a radio access bearer connection with a core network node, and performing user plane data transmission with the core network node by using a user plane protocol stack, wherein the user plane protocol stack comprises a physical layer, a data link layer, and a network layer, wherein the network layer comprises an IPv6 header, wherein a flow label of the IPv6 header carries a user plane tunnel endpoint identifier (TEID);

receiving a radio access bearer setup request sent by the core network node, wherein the user plane protocol stack uses the flow label to carry the user plane TEID, and wherein when the user plane protocol stack uses the flow label to carry the user plane TEID, the radio access bearer setup request comprises an interface flow label, wherein the interface flow label carries a first bearer identity that is allocated to a user plane TEID of the radio access bearer; and allocating a second bearer identity to the user plane TEID of the radio access bearer, recording a mapping relationship between the first bearer identity and the second bearer identity, constructing an radio access bearer setup response by using the second bearer identity, and sending the response to the core network node.

* * * * *